June 5, 1945.  F. G. BORN ET AL  2,377,318
BRAKE CONTROL FOR VEHICLE TRAINS
Filed Sept. 13, 1943  2 Sheets-Sheet 1

INVENTORS
Frank G. Born and John George Oetzel
BY Parker, Carlson, Pitzner & Hubbay
ATTORNEYS June 5, 1945.  F. G. BORN ET AL  2,377,318
BRAKE CONTROL FOR VEHICLE TRAINS
Filed Sept. 13, 1943  2 Sheets-Sheet 2
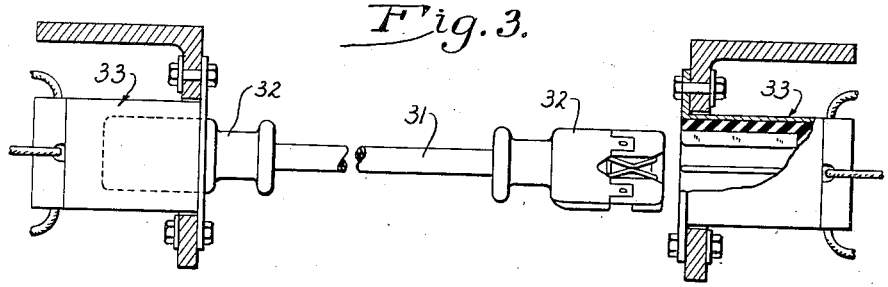
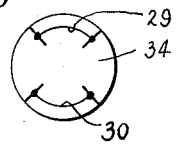
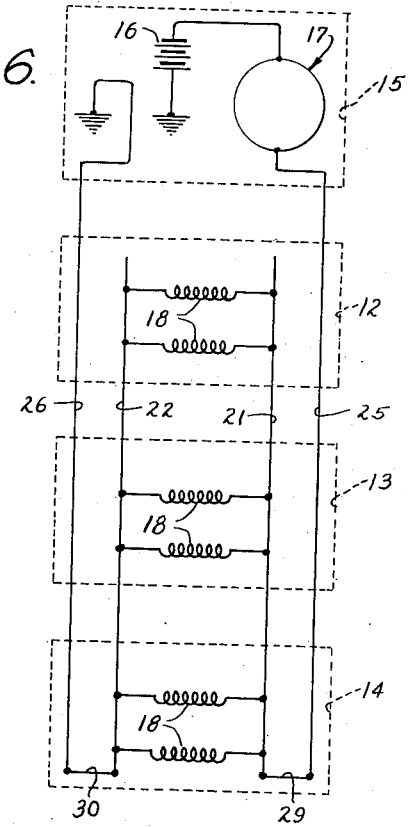
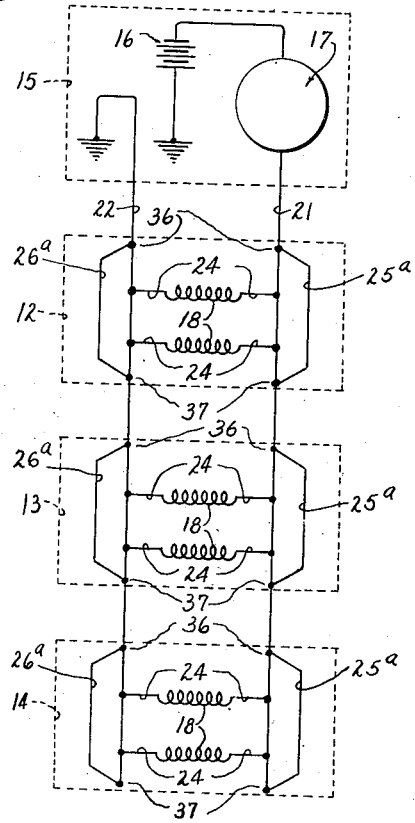
INVENTORS
Frank G. Born and John George Oetzel
BY Parker, Carlson, Pitzner & Hubbard
ATTORNEYS Patented June 5, 1945

2,377,318

UNITED STATES PATENT OFFICE 2,377,318

BRAKE CONTROL FOR VEHICLE TRAINS

Frank G. Born and John George Oetzel, Beloit, Wis., assignors to Warner Electric Brake Manufacturing Company, South Beloit, Ill., a corporation of Illinois Application September 13, 1943, Serial No. 502,138

10 Claims. (Cl. 188—3)

This invention relates to the control of the brakes on a succession of vehicles connected to travel in a train and more particularly to the control of electric brakes on such vehicles.

When a plurality of vehicles individually equipped with electrically controllable brakes have been operated in a train, it has been the practice heretofore to extend two current supply conductors through the train and to connect the windings of the different vehicle brakes in parallel across said conductors. With this arrangement, the brakes of each vehicle are energized to a substantially greater degree than those of the succeeding vehicle, a condition conducive to "jack-knifing" and unsafe operation, particularly on slippery roads. In addition, with the conductors ordinarily used, a relatively small portion of the available capacity of each brake is capable of being utilized.

The present invention aims to overcome these objections and provide a novel wiring arrangement which enables a substantially larger part of the full brake capacities to be utilized, and this without employing extra large conductors.

Other objects and advantages of the invention will become apparent from the following detailed description taken in connection with the accompanying drawings, in which Figure 1 is a schematic view and wiring diagram of the vehicle train and brake control system.

Fig. 3 is a fragmentary plan view of the cable connections between adjacent vehicles.

Fig. 4 is a schematic end view of a connecting plug.

Fig. 5 is a view similar to Fig. 2 showing a simplification.

Fig. 6 is a simplified wiring diagram similar to Fig. 2 showing a modification of the invention.

Figure 1:
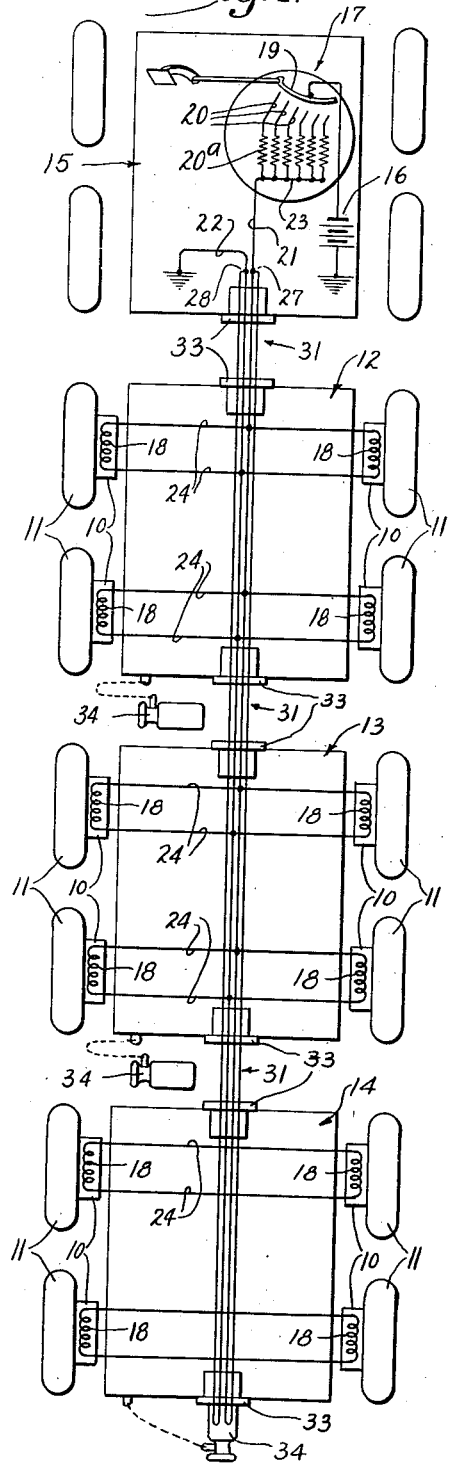

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

For purposes of illustration, the invention is shown embodied in a system for controlling the energization of electric brakes 10 on the front and rear wheels 11 of three trailer vehicles 12, 13, and 14 connected by couplings (not shown) for operation in a train which is drawn by a tractor 15. The latter carries a source of energizing current such as a battery 16 and a voltage regulator such as a rheostat 17 manually controllable to energize all of the brakes and graduate the degree of such energization. Each of the brakes 10 may be constructed as shown in Patent No. 1,882,050 so as to exert a retarding force on the vehicle wheel proportional to the degree of energization of its magnet winding 18.

The controller illustrated is of the stepped type as shown in Patent No. 1,952,679. Movement of its contact 19 from the idle position shown picks up coacting contacts 20 successively to insert corresponding resistances 20$^a$ in parallel in the brake circuit which is closed when the first contact is engaged, the current flow being increased step-by-step as the successive resistance elements are included.

Figure 2:
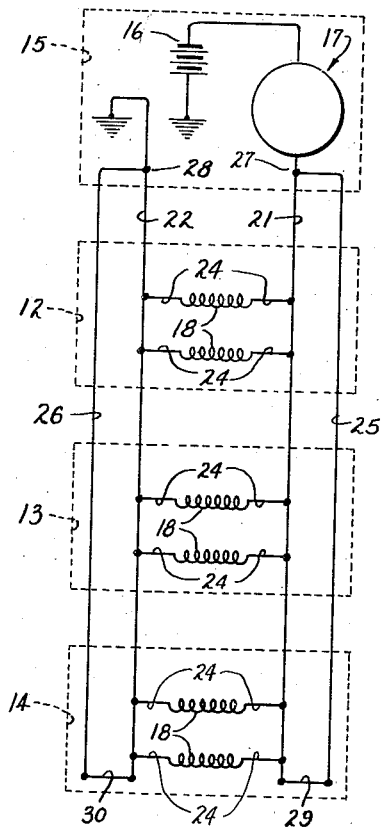
Fig. 2 is a simplified wiring diagram.

In the preferred form shown in Figs. 1 and 2, the windings 18 for all of the trailer brakes are connected in parallel between two conductors 21 and 22 which extend from points on the tractor 15 throughout the lengths of all of the trailer vehicles. At its forward end, the conductor 22 is grounded and thus is connected to the grounded terminal of the battery 16. The other terminal of the latter extends to the movable rheostat contact 19 whose common terminal 23 is connected to the forward end of the conductor 21. On each trailer conductors 24 connect each brake winding 18 across the conductors 21 and 22.

Secondary insulated conductors 25 and 26 each extend throughout the train and are connected at 27 and 28 on the tractor to the forward ends of the conductors 21 and 22 respectively. The rearmost ends of the conductors 25 and 26 are connected by conductors 29 and 30 to the rear ends of the conductors 21 and 22 respectively. To facilitate connection and disconnection of the adjacent vehicles so that a greater or lesser number may be included in the train, the four conductors 21, 22, 23 and 24 between the adjacent vehicles are disposed within a short flexible cable 31 having terminal plugs 32 at opposite ends removably inserted in sockets 33 on the adjacent ends of adjacent vehicles (see Fig. 3). Terminals on the plugs and sockets interengage to connect the corresponding conductors on adjacent vehicles. The conductors 29 and 30 are carried by a plug 34 which in the case of the last trailer in line is inserted in the rearmost socket 33 to join the conductors 21 and 25 and the conductors 22 and 26.

With the circuit arrangement above described, it will be apparent that each winding is energized through two circuits, one extending from the controller 17 through the forward end portion of the conductor 21, the brake winding 18, and back through the forward end portion of the conductor 22. The second branch for the same winding extends through the full length of the conductor 25, the conductor 29, the rear end portion of the conductor 21, the brake winding, the rear end portion of the conductor 22, the conductor 30, and forwardly through the conductor 26. As a result, the combined resistances of the two paths for each of the different brake windings are substantially equal so that the brakes on the successive trailers are energized approximately equally when the circuit is closed in spite of the fact that these windings are located at different distances from the source of current. This same relation obtains irrespective of the number of trailers which are connected together in the train. Moreover, the resistance of each brake circuit, due to the connecting conductors, is reduced to such an extent that each brake may be energized to its full capacity, and, therefore, is capable of delivering full retarding torque. For example, by employing standard No. 8 gauge wire, the front and rear brakes of a train of three four-wheel trailers will be energized substantially equally and each will be capable of developing full torque.

Instead of employing the insulated shunt conductors 25 and 26 extending throughout the line of trailers, separate shunt conductors 25ᵃ and 26ᵃ may be provided on each trailer as shown in Fig. 5 with their opposite ends connected at points 36 and 37 on the front and rear ends of the trailer to the conductors 21 and 22, the connection preferably being at the terminals of the sockets 33. Thus the conductors 25ᵃ and 26ᵃ on any one trailer are adapted to conduct current around the brake windings 18 on the trailer and cooperate with the portions of conductors 21 and 22 within the cables 31 to form the complete shunts for effecting the desired reduction in the overall resistance of the double circuit for any one brake winding. This arrangement is further advantageous in that it eliminates the necessity of the plug 34 at the rear end of the rear trailer. Also, only two wires are required in each cable 31 these preferably being made of somewhat larger gauge so as to produce the desired low combined resistance.

At some sacrifice of braking power, the forward connections at 27 and 28 between the conductors 21 and 25 and the conductors 22 and 26 may be omitted while still obtaining the desired distribution of relative retarding of the brakes of successive trailers. Such an arrangement is shown in Fig. 6 wherein there is one circuit for each brake winding 18 extending from the controller 17 rearwardly through the conductor 25 to the rear end of the last trailer in line, then forwardly through the conductor 21, the brake winding 18, rearwardly through the conductor 22, and finally forwardly through the conductor 26. Thus the circuit resistance for the individual brakes is lowest for the brakes on the last trailer in line and increases through the successive trailers progressing forwardly. As a result, the braking action applied to each trailer is slightly greater than that on the preceding trailer in the train, a condition for effectually preventing any possibility of jackknifing in service use.

We claim as our invention:

1. The combination with a vehicle train comprising a tractor and a succession of trailers, first and second insulated conductors extending from said tractor throughout the line of trailers, an electrically controlled brake on each of said trailers having a winding with opposite terminals joined on the trailer to the first and second conductors respectively, means on the tractor operable to close the circuit through said conductors and windings to energize the latter simultaneously and vary the degree of such energization selectively, a shunt conductor extending throughout the train of trailers and connected at its forward and rear ends to the forward and rear ends respectively of said first conductor, and a second shunt conductor extending throughout the train of trailers and connected at its forward and rear ends to the forward and rear ends respectively of said second conductor.

2. The combination with a vehicle train comprising a tractor and a succession of trailers, a pair of insulated conductors extending from said tractor throughout the line of trailers, an electrically controlled brake on each of said trailers having a winding with opposite terminals joined on the trailer to the respective conductors respectively, means on the tractor operable to close the circuit through said conductors and windings to energize the latter simultaneously and vary the degree of such energization selectively, and secondary shunt conductors connected to said first conductors and providing parallel branch circuits for each of said windings substantially equalizing the resistance of the circuits for the different brake windings.

3. The combination with a vehicle train comprising a tractor and a succession of trailers, a pair of insulated conductors extending from said tractor throughout the line of trailers, an electrically controlled brake on each of said trailers having a winding with opposite terminals joined on the trailer to the respective conductors of said pair, a second pair of conductors extending throughout the line of trailers and connected on the rearmost trailer to the respective conductors of said first pair, and means on the tractor operable to apply current across the conductors of one of said pairs to energize said windings simultaneously and vary the degree of such energization selectively.

4. The combination with a vehicle train comprising a tractor and a succession of trailers, a pair of insulated conductors extending from said tractor throughout the line of trailers, an electrically controlled brake on each of said trailers having a winding with opposite terminals joined on the trailer to the respective conductors of said pair, a second pair of conductors extending throughout the line of trailers, the four conductors terminating in the last trailer in line a coupling element, a second coupling element detachably interengageable with said first element and operable when interengaged to connect the rearmost ends of the conductors of one pair with the respective conductors of the other pair, and means on the tractor operable to apply current across the conductors of one of said pairs to energize said windings simultaneously and vary the degree of such energization selectively.

5. The combination with a vehicle train comprising a tractor and a succession of trailers, a pair of insulated conductors extending from said tractor throughout the line of trailers, an electrically controlled brake on each of said trailers having a winding with opposite terminals joined on the trailer to the respective conductors of said pair, a second pair of conductors extending throughout the line of trailers and connected on the rearmost trailer to the respective conductors of said first pair, the forward ends of the conductors of both pairs being disconnected from each other, and means on the tractor operable to apply current across the conductors of said second pair to energize said windings simultaneously and vary the degree of such energization selectively.

6. The combination with a vehicle train comprising a tractor and a succession of trailers, two pairs of insulated conductors extending from the front to the rear of each of said trailers and terminating in coupling elements, four conductor cables extending between the adjacent vehicles and having coupling members interengageable with said elements to connect the corresponding conductors of successive trailers, an auxiliary coupling member detachably engaging the coupling element on the rear end of the last trailer to connect the respective conductors of the two pairs, an electrically controlled brake on each of said trailers having a winding with opposite terminals connected across the conductors of one of said pairs, and means on the tractor operable to close a circuit across the conductors of one of said pairs whereby to energize said windings simultaneously and vary the degree of such energization selectively.

7. The combination with a vehicle train comprising a tractor and a succession of trailers of, a pair of insulated conductors extending from the tractor throughout the line of trailers, an electrically controlled brake on each trailer having a winding with opposite terminals continuously connected on the trailer to the respective conductors of said pair, means including a current source on the tractor for completing the circuit between said conductors and energizing all of said windings, and conductors continuously shunting the brake windings on the successive trailers whereby to provide an auxiliary energizing circuit for each of said brake windings, said auxiliary circuits including said first mentioned conductors and being energized simultaneously with said first mentioned circuit.

8. The combination with a vehicle train comprising a tractor and a succession of trailers of, a pair of insulated conductors extending from the tractor throughout the line of trailers, an electrically controlled brake on each trailer having a winding with opposite terminals continuously connected on the trailer to the respective conductors of said pair, and a pair of continuous conductors providing a secondary energizing circuit for each brake winding extending from the tractor first to the rear end of the last trailer in line and thence forwardly past the successive brake windings on the other trailers.

9. The combination with a vehicle train comprising a tractor and a succession of trailers of, a pair of insulated conductors extending from the tractor throughout the line of trailers, an electrically controlled brake on each trailer having a winding with opposite terminals connected on the trailer to the respective conductors of said pair, and a pair of shunt conductors on each trailer each connected at opposite ends to one of said first mentioned conductors on opposite sides of the connections thereof to said brake windings.

10. The combination with a vehicle train comprising a tractor and a succession of trailers of, a pair of insulated conductors extending from the tractor throughout the line of trailers, an electrically controlled brake on each trailer having a winding with opposite terminals connected on the trailer to the respective conductors of said pair, and conductors formed in part by portions of said first conductors and shunting said brake windings.

FRANK G. BORN.
JOHN GEORGE OETZEL.